US008614170B2

(12) United States Patent
Ali et al.

(10) Patent No.: US 8,614,170 B2
(45) Date of Patent: Dec. 24, 2013

(54) METHOD FOR TREATING FRACTURING WATER

(75) Inventors: Syed Ali, Sugar Land, TX (US); Shawn McCleskey Rimassa, Houston, TX (US); Francois M. Auzerais, Boston, MA (US); Curtis L. Boney, Houston, TX (US); Leiming Li, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 129 days.

(21) Appl. No.: 12/643,239

(22) Filed: Dec. 21, 2009

(65) Prior Publication Data

US 2010/0190666 A1 Jul. 29, 2010

Related U.S. Application Data

(60) Provisional application No. 61/141,344, filed on Dec. 30, 2008.

(51) Int. Cl.
*C09K 8/532* (2006.01)
*C09K 8/68* (2006.01)

(52) U.S. Cl.
USPC ............ 507/90; 507/201; 507/235; 507/240; 507/244; 507/247; 507/248; 507/254; 507/256; 507/263; 507/266; 507/267; 507/268; 507/269; 507/276

(58) Field of Classification Search
USPC ......... 507/235, 203, 239, 240, 243, 245, 256, 507/266, 268, 274, 276, 277
See application file for complete search history.

(56) References Cited

U.S. PATENT DOCUMENTS

| 3,199,591 | A | * | 8/1965 | Kepley .......................... 166/279 |
| 5,393,439 | A | * | 2/1995 | Laramay et al. .............. 507/211 |
| 5,405,531 | A | | 4/1995 | Hitzman et al. |
| 2005/0238729 | A1 | | 10/2005 | Jenneman et al. |
| 2008/0032949 | A1 | | 2/2008 | Jones et al. |

OTHER PUBLICATIONS

Control of Microbial Souring by Nitrate, Nitrite or Glutaraldehyde Injection in a Sandstone Column. Reinsel, MA, Sears, JT, Stewart, PS, and McInerey, MJ. Journal of Industrial Microbiology (1996) 17, pp. 128-136.

(Continued)

*Primary Examiner* — John J Figueroa
(74) *Attorney, Agent, or Firm* — Matthieu Vandermolen; Daryl Wright; Tim Curington

(57) ABSTRACT

A method of treating a medium for water fracturing is disclosed, the method comprises: introducing at least one biocide and at least one metabolic inhibitor in the medium, using the medium for water fracturing. In another aspect a method of controlling the post-fracture reservoir souring by the metabolic activities of sulfate reducing bacteria of a well is described: at least one biocide and at least one metabolic inhibitor are introduced in a medium made of water, the medium is used for fracturing the well, and the medium remains in the reservoir to kill and/or inhibit growth of sulfate reducing bacteria.

12 Claims, 2 Drawing Sheets

(56) References Cited

OTHER PUBLICATIONS

SPE92795—Use of Nitrate to Mitigate Reservoir Souring in Bonga Deepwater Development, Offshore Nigeria. Kuijvenhoven, C., Bostock, A, Chappell, D., Noirot, JC and Khan, A. 2005 SPE International Symposium on Oilfield Chemistry, Houston, Feb. 2-4.

Synergistic Inhibition of Microbial Sulfide Production by Combinations of the Metabolic Inhibitor Nitrite and Biocides. Greene, E.A., Brunelle, V., Jenneman, G.E., Voordouw, G. Applied and Environmental Microbiology, Dec. 2006, pp. 7897-7901, Vo.72, No. 12. American Society for Microbiology.

Use of Microbiocides in Barnett Shale Gas Well Fracturing Fluids to Contol Bacteria Related Problems. Fichter, J. K., Johnson, K., French, K., and Oden, R. NACE International—Corrosion 2008 Conference & Expo.

* cited by examiner

METHOD FOR TREATING FRACTURING WATER

CROSS-REFERENCE TO RELATED APPLICATIONS

This application claims the benefit of U.S. Provisional Application No. 61/141,344, filed Dec. 30, 2008, which is incorporated herein by reference in its entirety.

FIELD OF THE INVENTION

The invention relates to a method of treatment of water for fracturing a subterranean petroleum reservoir. More particularly, the invention relates to a method of controlling the post-fracture reservoir souring.

BACKGROUND

The statements in this section merely provide background information related to the present disclosure and may not constitute prior art.

Today, many operators are using simple water frac treatments to stimulate production from tight sand and shale formations. Water is preferred because it is cheaper than polymer-based treatments. The volumes of water used in fracturing treatments range from tens of thousands gallons to more than 5 million gallons. Water used in fracturing process is obtained from variety of sources which include freshwater supply wells, chlorinated city water, rain water, pond water, lake water and occasionally frac flow-back water. Each of these water sources will have some level of bacterial contamination.

Since large volumes of water are pumped during fracturing treatments resulting in near wellbore cooling, this provides a favorable temperature for bacteria growth. Although the frac water is treated with biocide, post-fracture reservoir souring, the production of hydrogen sulfide by sulfate reducing bacteria (SRB) has recently been reported.

Biocides are very effective in controlling the SRB in surface facilities and flowlines, but 100% kill rate in reservoir is difficult to achieve. SRB bacteria can be planktonic (free floating) and sessile (attached to surfaces). Given the exponential growth of sessile SRB, only one bacterium needs to survive the biocide innoculation to establish large colonies in the reservoir. Once formed into colonies, sessile SRB protect themselves with a biofilm that will inhibit the ability of the biocide to act on the colony.

The presence of sulfides (e.g., $H_2S$, $HS^-$, and $S^{2-}$) in fluids poses serious problems due to their toxicity and corrosive nature. It is well known that the presence of sulfides in many fluids is a consequence of the reduction of sulfates to sulfides by SRB. SRB are routinely found in water associated with oil production systems.

The requirements for SRB activity and growth include an anaerobic environment containing adequate nutrients, such as an electronic donor. A typical electron acceptor is sulfate, which produces hydrogen sulfide upon reduction. Typical electron donors include volatile fatty acid and hydrocarbon. The volatile fatty acids are naturally occurring compounds that include acetate, propionate and butyrate in formation waters. These fatty acids are the key to the growth of SRB in the reservoir. Previously the sulfate was considered the prime cause of sulfide generation. Certainly the presence of sulfide is necessary but the volatile fatty acids can provide essential and necessary carbon source for SRB activity and resultant sulfide generation. It should be noted that available carbon source (i.e., volatile fatty acids) in formation waters is limited. By providing nitrate as an alternate electron receptor to replace sulfate, a viable treatment strategy could be based on microbial nitrate reduction which provides approximately three times more energy than the reduction of sulfate. Sulfate reduction requires eight electrons per mole while nitrate reduction utilizes only two electrons per mole. This promotes nitrates to be the preferred electron acceptors when both sulfate and nitrate are present. Consequently, bacteria that utilize nitrate will dominate the bacteria population by competing directly for the limited carbon (volatile fatty acids) energy source in the formation waters. This leads to the exponential increase of nitrate reducing (NRB) bacteria population that out-competes the SRB population for the limited food sources content. Besides competition, the formation of nitrite, which is formed as an intermediate product of the NRB metabolic activities, affects the indigenous bacteria population. Nitrite is inhibitory to some SRB species and acts as a chemical scavenger which contributes to sulfide removal.

Some prior arts intended to use said teachings. Especially, U.S. Pat. No. 5,405,531 discloses the use of nitrite, nitrate and/or molybdate to control the production of hydrogen sulfide by sulfate reducing bacteria in aqueous systems. In the same way, U.S. Patent Application No. 2005/0238729 promotes the use of glutaraldehyde and nitrite to synergistically inhibit sulfide production by sulfate reducing bacteria. In the same field, U.S. Patent Application No. 2008/0032949 discloses the use of embedded biocide made of Tetrakis(Hydroxymethyl) Phosphonium Sulphate (THPS). The liquid-based THPS reacts or interfere with the performance of commonly use oxygen scavengers.

None of the prior arts directly refer to method of controlling the post-fracture reservoir souring. And further, it is apparent that efficacy of SRB mitigation controls needs to be improved if the post-fracturing reservoir souring is to be effectively controlled. There is thus a need in the art for a cost-effective, efficient and easy treatment of the post fracturing water.

SUMMARY

A method of treating a medium for water fracturing is disclosed. The method includes introducing at least one biocide and at least one metabolic inhibitor in the medium, and using the medium for water fracturing.

The biocide can be selected from the group consisting of glutaraldehyde, bronopol, tetrakishydroxymethyl phosphonium sulfate (THPS), benzalkonium chloride, hypochlorous acid and a combination thereof. And as well, the metabolic inhibitor can be taken in the list constituted of: nitrite, nitrate, molybdate, tungstate, selenate and any combination thereof.

When the metabolic inhibitor is nitrate, the nitrate can be sodium nitrate, potassium nitrate, calcium nitrate or any combination thereof. When the metabolic inhibitor is nitrite, the nitrite can be sodium nitrite, potassium nitrite, calcium nitrite or any combination thereof. When the metabolic inhibitor is molybdate, the molybdate can be sodium molybdate, potassium molybdate, lithium molybdate or any combination thereof.

In an alternative embodiment, the method can further comprise introducing an oxygen scavenger in the medium. The oxygen scavenger can be thiosulfate or ammonium bisulfate.

Still in an alternative embodiment the method can further comprise introducing a water wetting surfactant in the medium.

By way of other alternatives, the biocide can be a non-oxidizing biocide selected from the group consisting of bronopol, carbamate, metronidazole, 2-bromo-2-nitropropane-1,3-diol (BNPD), 2,2-dibromo-3-nitrilopropionamide (DBNPA), Dodecylguanidine hydrochloride (DGH), dithiocarbamates, glutaraldehyde, methylene bis thiocyanate (MBT), methylchloro/methylisothiazolone (MCMI), quaternary ammonium compounds like alkyl dimethyl benzyl ammonium chloride (ADBAC) or didecyl dimethyl ammonium chloride (DDAC), polyquaternary ammonium compounds like poly(oxyethyleneiminioethyleneiminoioethylene dichloride), terbuthylazine (TBZ), 2-thiocyanomethylthiobenzothiazole (TCMTB), tetrakishydroxymethyl Phosphonium sulfate (THPS), and tris nitro 2-nitro-2-hydroxymethyl-1,3-propanediol, Tetrahydro-3,5-dimethyl-2H-1,3,5-thadiazine-2-thion and any combination thereof.

The biocide can be an oxidizing biocide selected from the group consisting of: sodium hypochlorite, trichloroisocyanuric acids, dichloroisocyanuric acid, calcium hypochlorite, lithium hypochlorite, chlorinated hydantoin, stabilized sodium hypobromite, activated sodium bromide, brominated hydantoins, chlorine dioxide, ozone, peroxides, and any combination thereof.

In another aspect a method of controlling the post-fracture reservoir souring by the metabolic activities of sulfate reducing bacteria of a well is disclosed. The method includes introducing at least one biocide and at least one metabolic inhibitor in a medium made of water, fracturing the well with the medium, allowing said medium to remain in the reservoir to kill and/or inhibit growth of sulfate reducing bacteria. The biocide component is capable of directly killing the SRB on surface; and the metabolic inhibitor is capable to inhibit the growth of residual SRB in the reservoir.

The biocide can be selected from the group consisting of glutaraldehyde, bronopol, tetrakishydroxymethyl phosphonium sulfate (THPS), benzalkonium chloride, hypochlorous acid and any combination thereof. And as well, the metabolic inhibitor can be selected from the group consisting of nitrite, nitrate, molybdate, tungstate, selenate and any combination thereof.

When the metabolic inhibitor is nitrate, the nitrate can be sodium nitrate, potassium nitrate, calcium nitrate or any combination thereof. When the metabolic inhibitor is nitrite, the nitrite can be sodium nitrite, potassium nitrite, calcium nitrite or any combination thereof. When the metabolic inhibitor is molybdate, the molybdate can be sodium molybdate, potassium molybdate, lithium molybdate or any combination thereof.

The method can also further comprise introducing an oxygen scavenger in the medium. The oxygen scavenger can be thiosulfate or ammonium bisulfate. Still, the method can further comprise introducing a water wetting surfactant in the medium.

The method is advantageously used when the medium is essentially water or brine, other alternatives of medium can also be used.

In another aspect a method of treating the well is disclosed. The method provides a medium comprising water; introduces at least one biocide and at least one metabolic inhibitor in the medium; and uses the medium for treating the well.

DETAILED DESCRIPTION

Figure 1:
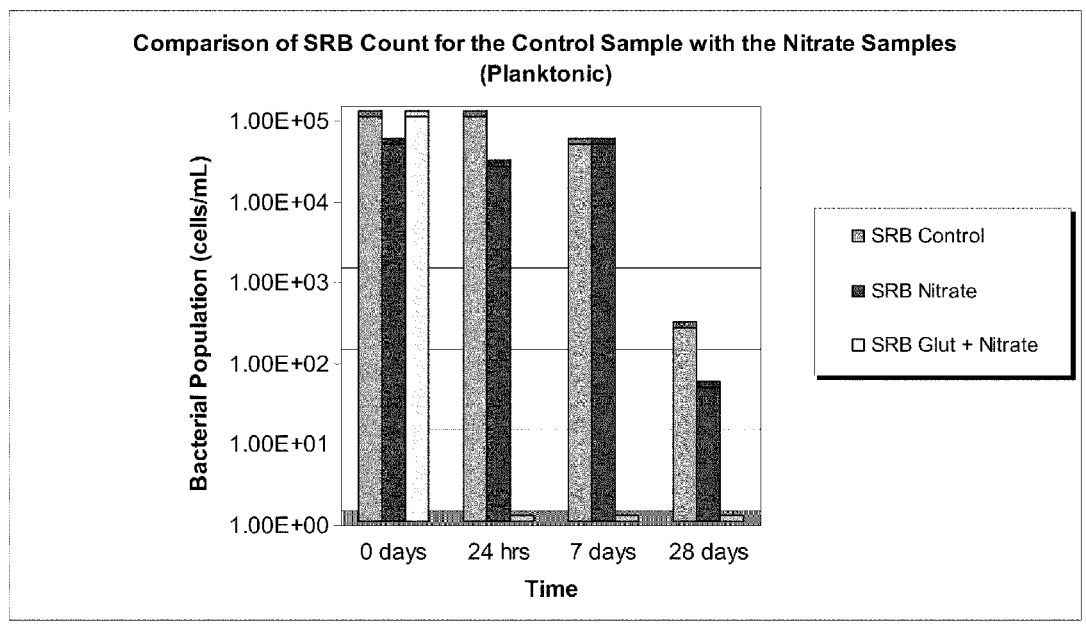
FIG. 1 shows a graph with efficacy of metabolic inhibitor for a first type of sulfate reducing bacteria (Planktonic type) in water collected after a fracturing treatment.

At the outset, it should be noted that in the development of any actual embodiments, numerous implementation-specific decisions must be made to achieve the developer's specific goals, such as compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Sulfide production by sulfate-reducing bacteria (SRB) can be more effectively inhibited by treating the SRB with certain synergistic combinations of biogenic sulfide inhibitors (BSIs). As used herein, "sulfate-reducing bacteria" or "SRB" shall denote one or more types of bacterium capable of facilitating the reduction of sulfates to sulfides. As used herein, "biogenic sulfide inhibitor" or "BSI" shall be used as a generic term to denote any compound that effectively inhibits sulfide production by at least one type of sulfate-reducing bacterium. BSIs of particular significance in the embodiments include biocides and metabolic inhibitors. As used herein, "biocide" shall denote a compound that directly kills at least one type of sulfate-reducing bacterium via contact therewith. As used herein, "metabolic inhibitor" shall denote a compound that effectively inhibits the sulfate-reducing activity of at least one type of sulfate-reducing bacterium, without directly killing the inhibited sulfate-reducing bacterium upon contact therewith. Metabolic inhibitors deprive SRB of the ability to produce adenosine triphosphate (ATP) and, as a result, cells are unable to grow and/or divide. This inability to grow or divide may eventually cause the death of some of the SRB; however, the cell death is not a direct result of exposure to the metabolic inhibitors as it would be for biocides.

The present methods are applicable to the treatment of fracturing water in one embodiment, also similar method may be applicable to treatment of any water source that may be or become contaminated with SRB.

In accordance with one embodiment, the method comprises the step of contacting with a treated medium comprising more than one BSI to thereby synergistically inhibit biogenic sulfide production. The treated medium comprises at least one biocide and at least one metabolic inhibitor. Biocides suitable for use include both oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example chlorine products like: sodium hypochlorite, trichloroisocyanuric acids, dichloroisocyanuric acid, calcium hypochlorite, lithium hypochlorite, or chlorinated hydantoins. Suitable oxidizing biocides can also include, for example bromine products like: stabilized sodium hypobromite, activated sodium bromide, or brominated hydantoins. Suitable oxidizing biocides can also include, for example chlorine dioxide, ozone, or peroxides. The biocide can be selected from a group consisting of glutaraldehyde, tetrakis(hydroxymethyl)phosphonium sulfate, bronopol and benzalkonium chloride. Metabolic inhibitors suitable for use include, for example, nitrite, nitrate, molybdate, tungstate, selenate, anthraquinone and equivalent.

The synergistic inhibitory effect resulting from the combined use of a biocide and a metabolic inhibitor can be demonstrated by comparing the inhibitory effect of the combined BSIs with the inhibitory effect of each individual BSI, when used alone. This synergistic inhibitory effect can be quantified by comparing the concentrations of the combined BSIs necessary to provide effective biogenic sulfide inhibition with the concentrations of each individual BSI necessary to provide effective sulfide inhibition when each individual BSI is used alone. Said synergetic effect is shown in U.S. Patent Application No. 2005/0238729 incorporated herein by reference.

According to another embodiment, the method of controlling the post-fracture reservoir is carried out by injecting into the well at least one biocide and at least one metabolic inhibitor in either a simultaneous or sequential fashion. The biocide and metabolic inhibitor components can be simultaneously introduced into the well to contact with the SRB by first combining the biocide (and/or a precursor of the biocide) and metabolic inhibitor (and/or a precursor of the metabolic inhibitor) in a treated medium and contacting the SRB with the treated medium. Nitrate is one example of a precursor of nitrite. The specific composition of the treated medium can vary greatly, depending upon the particular characteristics of the well for which biogenic sulfide inhibition is sought. Thus, the treated medium can be any medium suitable for carrying the biocide and metabolic inhibitor components. The treated medium may be an aqueous-based medium, the treated medium comprises at least about 2% water by weight, or at least about 50% water by weight, or at least 90% water by weight.

The synergistic inhibition provided by the combined biocide and metabolic inhibitor components of the treated medium allow for effective biogenic sulfide inhibition at concentrations substantially less than the minimum inhibitory concentrations (MICs) of the individual components. Effectively, the concentration of an individual BSI necessary to effectively inhibit sulfide production by SRB can be expressed as a minimum inhibitory concentration (MIC). As used herein, "minimum inhibitory concentration" or "MIC" shall denote the minimum concentration of an individual BSI necessary to prevent sulfide production by SRB for 30 days after contact with the SRB is initiated. Thus, the concentrations of the biocide and the metabolic inhibitor components of the treated medium may be less than the MICs of the individual biocide and metabolic inhibitor components. The concentrations of both the biocide and the metabolic inhibitor can be less than about 90% of their respective MICs. Still, the concentrations of one or both the biocide and the metabolic inhibitor can be less than about 75% of their respective MICs. Even, the concentrations of one or both of the biocide and the metabolic inhibitor can be less than about 50% of their respective MICs. Yet still, the concentrations of one or both the biocide and the metabolic inhibitor can be less than about 35% of their respective MICs. The concentrations of one or both the biocide and the metabolic inhibitor can be less than 25% of their respective MICs.

In one embodiment, the biocide is an aldehyde and the metabolic inhibitor is nitrite and/or molybdate. When the biocide is an aldehyde and the metabolic inhibitor is nitrite and/or molybdate, the treated medium can have a biocide to metabolic inhibitor molar ratio in the range of from about 50:1 to about 1:50, or about 20:1 to about 1:20, or about 10:1 to about 1:10, or 5:1 to 1:5. In addition, when the biocide is an aldehyde, the concentration of the biocide in the treated medium can be in the range of from about 0.1 to about 5 mM, (milliMolar) or about 0.1 to about 3 mM, or 0.1 to 2 mM. When the metabolic inhibitor is nitrite and/or molybdate, the concentration of the metabolic inhibitor in the treated medium can be in the range of from about 0.1 to about 5 mM, or about 0.1 to about 3 mM, or 0.1 to 2 mM. In some embodiments, the biocide component contacted with the SRB consists essentially of glutaraldehyde and the metabolic inhibitor component contacted with the SRB consists essentially of nitrite.

When the metabolic inhibitor comprises nitrite or nitrate ion, the concentration may be between 1 to 600 ppm, when the metabolic inhibitor comprises molybdate, tungstate or selenate ion, the concentration may be between 5 to 300 ppm. When the biocide comprises tetrahydro-3,5-dimethyl-2H-1, 3,5-thadiazine-2-thion, the concentration may be between 250 ppm to 1500 ppm.

According to one aspect, the method comprises introducing at least one biocide and at least one metabolic inhibitor in medium for use for water fracturing. The method may comprise the step of treating the medium used for water fracturing first and introducing said medium into the well for water fracturing. In an alternative way, the method first comprises a step of water fracturing and after the step of treating the well with the medium.

The treated medium and the SRB can be contacted in either an intermittent (i.e., batch) or continuous fashion. The method can be carried out in a substantially continuous manner.

The medium may contain other additives to tailor properties of the fluid. Rheological property modifiers such as friction reducers, viscosifiers, emulsions, stabilizers, solid particles such as proppant or fibers, or gases such as nitrogen may be included in the fluid. The medium may include viscosity modifying agents such as guar gum, hydroxyproplyguar, hydroxyelthylcellulose, xanthan, or carboxymethylhydroxypropylguar, diutan, chitosan, or other polymers or additives used to modify viscosity for use in the field. Water based fluids may include crosslinkers such as borate or organometallic crosslinkers. In some embodiments, the medium may contain viscosity modifying agents that comprise viscoelastic surfactant. Viscoelastic surfactants include cationic, anionic, nonionic, mixed, zwitterionic and amphoteric surfactants, especially betaine zwitterionic viscoelastic surfactant fluid systems or amidoamine oxide viscoelastic surfactant fluid systems.

The present method are discussed herein with specific reference to the embodiment of water fracturing fluid, fracturing pit fluid, or onshore or offshore water injector fluid, but it is also suitable for methods as gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Also, the present method may be used as a drilling fluid, completion fluid, coiled tubing fluid, sand control fluid, cementing composition fluid, or any other fluid that is introduced into the subterranean formation primarily for the recovery of hydrocarbons. The fluid is introduced to the subterranean formation by drilling equipment, fracturing equipment, coiled tubing equipment, cementing equipment, or onshore or offshore water injectors. During, before, or after the fluid is added to a subterranean formation, the formation may benefit from fracturing, drilling, controlling sand, cementing, or injecting a well.

To facilitate a better understanding of the present invention, the following examples of embodiments are given. In no way should the following examples be read to limit, or define, the scope of the invention.

EXAMPLES

A series of experiments were conducted to demonstrate method to treat a wellbore according to current embodiments.

Efficacy of metabolic inhibitor for sulfate reducing bacteria was tested. NACE standard TMO194-94 test method was employed for testing the presence of general heterotrophic bacteria (GHB), acid producing bacteria (APB), and sulphate reducing bacteria (SRB) in field mix water samples at 85 deg F. (29.4 deg C.) containing different metabolic inhibitors and microbiocides: 100 ppm active or 200 ppm of calcium nitration solution and 125 ppm active glut or 500 ppm glut solution were used.

Figure 2:
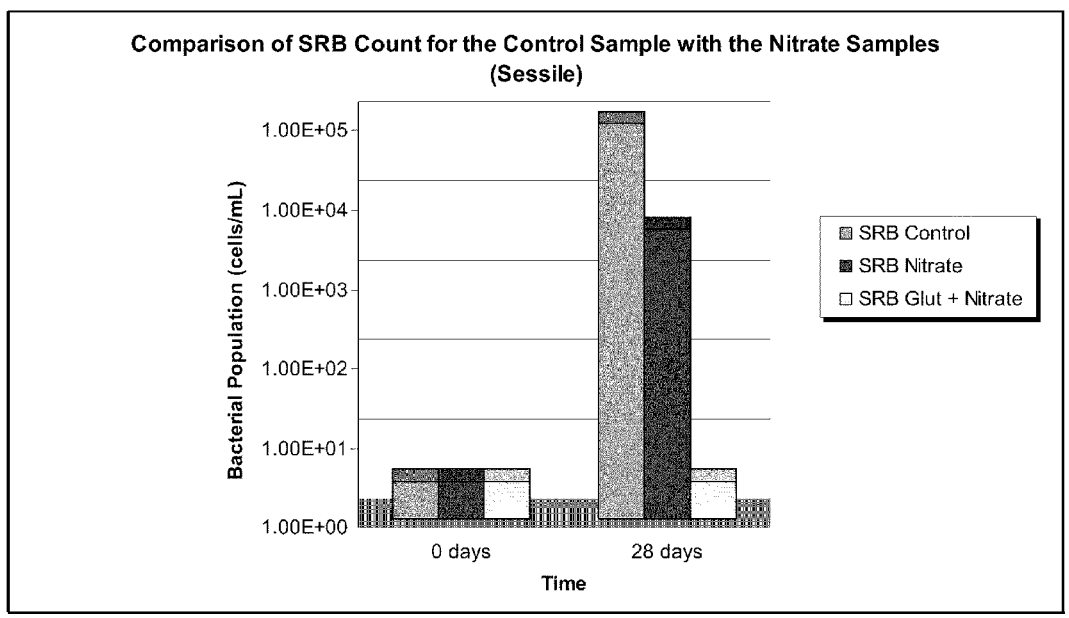
FIG. 2 shows a graph with efficacy of metabolic inhibitor for a second type of sulfate reducing bacteria (Sessile type) in water collected after a fracturing treatment.

In a first example, shown in FIG. 1, efficacy of metabolic inhibitor for planktonic sulfate reducing bacteria is tested. In a second example, shown in FIG. 2, efficacy of metabolic inhibitor for sessile sulfate reducing bacteria is tested. The examples show that the presence of the metabolic inhibitor kill and/or inhibit the growth of sulfate reducing bacteria (both planktonic and sessile) in water typically found or used in fracturing treatments. The maximum effect of the metabolic inhibitor on sulfate reducing bacteria is demonstrated clearly after 28 days and makes a greater impact on the sessile bacteria population than the planktonic population. Additionally, the examples show that the combination of the metabolic inhibitor with a biocide like glutaraldehyde also provides effective cidal action against the sulfate reducing bacteria (both planktonic and sessile) for long term kill (at least 28 days).

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

We claim:

1. A method of controlling the post-fracture reservoir souring by the metabolic activities of sulfate reducing bacteria of a well comprising:
   forming a fracturing fluid which comprises at least one oxidizing biocide and at least one metabolic inhibitor and an aqueous medium;
   adding an oxygen scavenger to the fracturing fluid,
   introducing the fracturing fluid into a well,
   allowing the fracturing fluid to remain in the reservoir for a period of at least 28 days, thereby
   killing at least 99.9% of the sulfate reducing bacteria in the reservoir.

2. The method of claim 1, wherein the metabolic inhibitor is selected from the group consisting of: nitrite, nitrate, molybdate, tungstate, selenate and any combination thereof.

3. The method of claim 1, wherein the metabolic inhibitor is nitrate selected from the group consisting of: sodium nitrate, potassium nitrate, calcium nitrate and any combination thereof.

4. The method of claim 1, wherein the metabolic inhibitor is nitrite selected from the group consisting of: sodium nitrite, potassium nitrite, calcium nitrite and any combination thereof.

5. The method of claim 1, wherein the metabolic inhibitor is molybdate selected from the group consisting of: sodium molybdate, potassium molybdate, lithium molybdate and any combination thereof.

6. The method of claim 1, wherein the oxygen scavenger is thiosulfate or ammonium bisulfate.

7. The method of claim 1, further comprising: introducing a water wetting surfactant in the medium.

8. The method of claim 1, wherein the aqueous medium consists essentially of water.

9. The method of claim 1, wherein the aqueous medium is brine.

10. The method of claim 1, further comprising: introducing a viscosifying agent into the fracturing fluid in the medium.

11. The method of claim 1, wherein the oxidizing biocide is selected from the group consisting of: sodium hypochlorite, hypochlorous acid, trichloroisocyanuric acids, dichloroisocyanuric acid, calcium hypochlorite, lithium hypochlorite, chlorinated hydantoin, stabilized sodium hypobromite, activated sodium bromide, brominated hydantoins, chlorine dioxide, ozone, peroxides, and any combination thereof.

12. The method of claim 1, further comprising introducing to the medium a compound selected from the group consisting of: glutaraldehyde, bronopol, benzalkonium chloride, carbamate, metronidazole, 2-bromo-2-nitropropane-1,3-diol (BNPD), 2,2-dibromo-3-nitrilopropionamide (DBNPA), Dodecylguanidine hydrochloride (DGH), dithiocarbamates, methylene bis thiocyanate (MBT), methylchloro/methylisothiazolone (MCMI), alkyl dimethyl benzyl ammonium chloride (ADBAC), didecyl dimethyl ammonium chloride (DDAC), oxyethyleneiminioethyleneiminoioethylene dichloride, terbuthylazine (TBZ), 2-thiocyanomethylthiobenzothiazole (TCMTB), tetrakishhydroxymethyl Phosphonium sulfate (THPS), and tris nitro 2-nitro-2-hydroxymethyl-1,3-propanediol, Tetrahydro-3,5-dimethyl-2H-1,3,5-thadiazine-2-thion and any combination thereof.

* * * * *